UNITED STATES PATENT OFFICE.

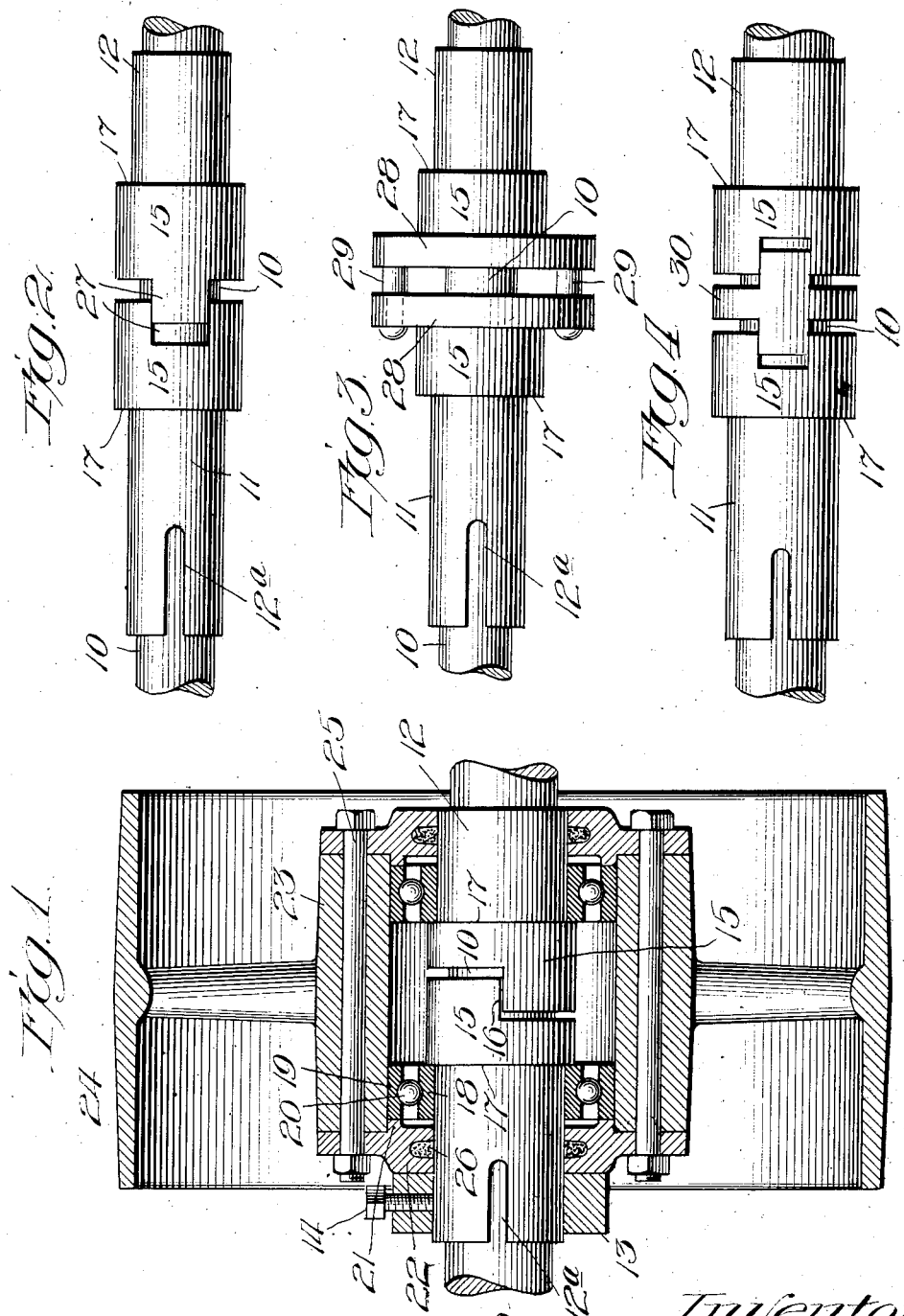

FREDERICK J. LEMLEY, OF CHICAGO, ILLINOIS.

BALL-BEARING PULLEY.

1,390,996.    Specification of Letters Patent.    Patented Sept. 20, 1921.

Application filed December 18, 1919. Serial No. 345,688.

*To all whom it may concern:*

Be it known that I, FREDERICK J. LEMLEY, a citizen of the United States, residing in Chicago, Cook county, Illinois, have invented certain new and useful Improvements in Ball-Bearing Pulleys, of which the following is a specification.

In the construction of ball bearing pulleys, it is the general practice to mount the pulley on a sleeve carried by the shaft, and the present invention is designed to improve the structure of such a sleeve and the means for mounting it upon the shaft so as to facilitate the assembling of the members composing the bearing and so as to better adapt the sleeve to meet slight variations in the dimensions of the pulley hub and to avoid the necessity for extreme precision in the finishing of certain of the parts. The invention consists in the features of construction, and combination of parts hereinafter described, and claimed.

In the drawings, Figure 1 is a sectional elevation of the ball bearing pulley of the present invention, showing the sleeve members in elevation, and Figs. 2, 3 and 4 are elevations showing modified arrangements of the sleeve sections.

The pulley of Fig. 1 is carried upon a shaft 10 on which are mounted the sleeve sections 11 and 12 respectively. The sleeve sections are bored to fit snugly upon the shaft and the sleeve section 11 is provided with a split extension 12 which receives a collar 13, having entered therethrough a set screw 14 adapted to be screwed down to compress the split end of the sleeve section into clamping engagement with the shaft.

Each of the sleeve sections at its inner end is provided with an enlarged head 15, each of the heads being shouldered on its inner face 16 to provide an interlocking engagement between the two sleeve sections, the depth of the shoulders being sufficient to provide for a slight degree of adjustment of the sections toward or from one another without breaking the interlock.

The enlarged heads 15 furnish shoulders 17—17 each of which affords an abutment for an inner ring-shaped runway 18, which is tightly fitted onto the sleeve and abuts closely against the adjacent sleeve head 15, the two sleeve heads being adjustable slightly in order to insure a proper positioning of the runways.

Each of the inner runways coöperates with an outer ring shaped runway 19, the ball bearing 20 being interposed between two runways. Each of the outer runways is held in adjusted position by the contact of a flange 21 formed on the inner face of a flange ring 22, the outer margin of which abuts against the face of the hub 23 of the pulley 24. The flange rings are held in position at opposite ends of the hub by means of bolts 25 which clamp the parts together, and hold the flange rings into proper engagement with the bearing runways which latter are thus held in a fixed position between the bearing rings and the sleeve shoulders. The bearing rings on their inner edges are recessed to provide for the insertion of a suitable packing 26, which serves to retain a lubricant and to exclude dust from the bearings.

In Fig. 2 the sleeve heads are formed to provide engaging faces of a male and female formation 27, and in Fig. 3 the sleeve heads are provided with flanges 28 held in spaced relation by means of connecting bolts 29, or the like. In Fig. 4, there is still another interlock shown in which an intermediate interlocking member 30 is employed having on each of its faces a male and female engagement with the adjacent sleeve head.

From the foregoing description, it will be seen that the formation of the sleeve sections is such that the parts may be readily assembled and the bearing elements accurately fitted to co-act with one another without the necessity for extreme accuracy in the fitting of the sleeves, which are designed to adjust themselves to the requirements of the bearing members. In claims where an interlock is referred to, it will be understood that this language is intended to cover any form of connection between the sleeve heads which adapts the sleeves to adjust themselves to one another whether the same be affected by direct engagement of the heads with one another or by the employment of an interposed member of the character illustrated in Fig. 4.

The desirability of providing a slight clearance between the interlocking sleeve sections will be further appreciated when it is understood that in assembling the ball runways it is of primary importance to maintain the inner and outer runways in exact alinement, since a slight end thrust in either direction would impair or destroy the efficiency of the ball bearings for anti-friction purposes. In assembling it is customary to force the inner runway of a pair into position on its sleeve, and in doing this the pressure will be applied solely to the inner runway, the outer runway being free from pressure. Thereafter, the parts thus assembled are forced into place within the hub of the pulley, and with this operation the pressure will be applied solely to the outer runway of the pair, the inner runway and its sleeve now being free to adjust themselves to the position required for a proper alining of the outer runway.

Without the provision of a sectioned sleeve such an assembling of the parts cannot be practised, and difficulty is frequently experienced in properly assembling the parts, and to secure an accurate fit considerable machining is required, which is not necessary in the case of the present invention, in which the parts will accurately position themselves to meet slight variations in hub length, which variations need not be corrected by careful machining.

I claim:

1. In a loose pulley, the combination of a shaft, sleeve sections mounted on the shaft and adjustable toward and from one another and having an interlocking engagement, a hub, concentric ball bearing runways interposed between the hub and the sleeve sections and flanges on the hub, bearing exteriorly against the outer runways.

2. In a ball bearing pulley, the combination of a shaft, sleeve sections mounted upon the shaft in sliding relation to one another, enlarged interlocking heads on the sleeves furnishing shoulders, concentric ball runways in contact with the respective shoulders, a hub enclosing the runways and provided with flanges bearing exteriorly against the outer runways, and a pulley carried by the hub.

3. In a loose pulley, the combination of a shaft, sleeve sections mounted on the shaft and adjustable toward and from one another and having an interlocking engagement, a hub, and ball bearing elements interposed between the hub and the sleeve sections, one of the sleeves being provided with a split extension, and a clamping collar carried by the extension for clamping the sleeve to the shaft.

4. In a ball bearing pulley, the combination of a shaft, sleeve sections mounted upon the shaft in sliding relation to one another, enlarged interlocking heads on the sleeves furnishing shoulders, concentric ball runways in contact with the respective shoulders, a hub inclosing the runways provided with flanges bearing against the outer runways, and a pulley carried by the hub, one of the sleeves being provided with a clamping collar carried by the extension for clamping the sleeves to the shaft.

5. In a loose pulley, the combination of a shaft, sleeve sections mounted on the shaft and slidably adjustable toward and from one another and having an interlocking engagement adapted to prevent relative rotation, said sleeve sections being each provided with an exteriorly facing abutment, an inner ball runway for each section bearing on its inner edge against the adjacent abutment, an outer ball runway concentrically held in spaced relation with respect to the co-acting inner runway, balls interposed between the runways composing a pair, and a hub encircling the runways and provided at each end with an inwardly extending peripheral flange bearing against the outer edge of the contiguous outer runway.

6. In a loose pulley, the combination of a shaft, sleeve sections mounted on the shaft and adjustable toward and from one another and having an interlocking engagement, said sleeve sections being each provided with an exterior abutment, an inner ball runway for each section bearing against the adjacent abutment, an outer ball runway concentrically held in spaced relation with respect to the coacting inner runway, balls interposed between the runways composing a pair, and a hub encircling the runways and provided with a bored hub closely encircling the outer runways, said hub being provided at each end with a bearing member engaged the outer edge of the adjacent outer runway.

7. In a loose pulley, the combination of a shaft, sleeve sections mounted on the shaft and adjustable toward and from one another and having an interlocking engagement, said sleeve sections being each provided with an exterior abutment, an inner ball runway for each section bearing against the adjacent abutment, an outer ball runway concentrically held in spaced relation with respect to the co-acting inner runway, balls interposed between the runways composing a pair, and a hub encircling the runways and provided with a bored hub closely encircling the outer runway, said hub having at each end a flange ring engaging the outer edge of the adjacent outer runway.

8. In a loose pulley, the combination of a shaft, sleeve sections mounted on the shaft and adjustable toward and from one another and having an interlocking engagement, said sleeve sections being each provideded with an exterior abutment, an inner ball runway for each section bearing against the adjacent abutment, an outer ball runway concentrically held in spaced relation with respect to the co-acting inner runway, balls interposed between the runways composing a pair, and a hub encircling the runways and provided with a bored hub closely encircling the outer runways, said hub having at each end a flange ring engaging the outer edge of the adjacent outer runway, and bored to fit closely against the adjacent sleeve section.

9. In a loose pulley, the combination of a shaft, sleeve sections mounted on the shaft and adjustable toward and from one another and having an interlocking engagement, said sleeve sections being each provided with an exterior abutment, an inner ball runway for each section bearing against the adjacent abutment, an outer ball runway concentrically held in spaced relation with respect to the co-acting inner runway, balls interposed between the runways composing a pair, a hub encircling the runways and provided with a bored hub closely encircling the outer unway, said hub having at each end a flange ring engaging the outer edge of the adjacent outer runway, and through bolts extending longitudinally through the hub for drawing the two end flange rings into close engagement with the respective ends of the hub.

10. In a loose pulley, the combination of a shaft, sleeve sections mounted on the shaft and adjustable toward and from one another and having an interlocking engagement, said sleeve sections being each provided with an exterior abutment, an inner ball runway for each section bearing against the adjacent abutment, an outer ball runway concentrically held in spaced relation with respect to the co-acting inner runway, balls interposed between the runways composing a pair, a hub encircling the runways and provided with a bored hub closely encircling the outer runways, said hub having at each end a flange ring engaging the outer edge of the adjacent outer runway, and bored to fit closely against the adjacent sleeve section, and through bolts extending longitudinally through the hub for drawing the two end flange rings into close engagement with the respective ends of the hub.

FREDERICK J. LEMLEY.